US008402551B2

(12) United States Patent
Lee

(10) Patent No.: US 8,402,551 B2
(45) Date of Patent: Mar. 19, 2013

(54) DIGITAL RIGHTS MANAGEMENT METHOD FOR TERMINAL

(75) Inventor: Hyun Joo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 959 days.

(21) Appl. No.: 11/969,179

(22) Filed: Jan. 3, 2008

(65) Prior Publication Data

US 2008/0163378 A1 Jul. 3, 2008

(30) Foreign Application Priority Data

Jan. 3, 2007 (KR) ........................ 10-2007-0000602

(51) Int. Cl.
*G06F 21/00* (2006.01)
(52) U.S. Cl. .................. 726/27; 726/4; 705/51; 705/59
(58) Field of Classification Search ................ 705/51, 705/59; 726/4, 27
See application file for complete search history.

(56) References Cited

U.S. PATENT DOCUMENTS

| 2003/0187801 | A1  |  10/2003 | Chase et al. |
| 2003/0206710 | A1* | 11/2003  | Ferman et al. ................. 386/46 |
| 2003/0226151 | A1  | 12/2003  | Hamada et al. |
| 2005/0021467 | A1* |  1/2005  | Franzdonk ...................... 705/51 |
| 2005/0119967 | A1* |  6/2005  | Ishiguro et al. ................. 705/38 |
| 2005/0132233 | A1* |  6/2005  | James et al. .................. 713/201 |
| 2005/0185918 | A1* |  8/2005  | Lowe .............................. 386/46 |
| 2005/0273399 | A1* | 12/2005  | Soma et al. ..................... 705/26 |
| 2006/0041511 | A1* |  2/2006  | Ahn ................................. 705/51 |
| 2006/0107330 | A1* |  5/2006  | Ben-Yaacov et al. ........... 726/26 |
| 2006/0126496 | A1* |  6/2006  | Filsfils et al. ................ 370/216 |
| 2007/0168288 | A1* |  7/2007  | Bozeman ....................... 705/51 |

FOREIGN PATENT DOCUMENTS

WO 2004077911 9/2004

OTHER PUBLICATIONS

Chen, "An Approach of Digital Rights Management for E-Museum with Enforce Context Constraints in RBAC Environments", 2006, SMC-IEEE, vol. 3, pp. 1871-1878.*

* cited by examiner

*Primary Examiner* — Taghi Arani
*Assistant Examiner* — Gregory Lane
(74) *Attorney, Agent, or Firm* — Lee, Hong, Degerman, Kang & Waimey

(57) ABSTRACT

A method for setting digital rights associated with content the method includes receiving a request from a user to access content comprising digital rights defined by a first set of attributes, identifying if the user has existing digital rights to the content, wherein the existing digital rights is defined by a second set of attributes, and modifying the existing digital rights associated with the content to include the first set of attributes. A terminal for issuing digital rights includes a digital rights management (DRM) server for issuing a rights object to a terminal or a content server; and a content server for encoding content using encryption keys issued from the DRM server and providing encoded content to the terminal in response to a content download request wherein the DRM server also issues content encryption keys to the content server.

10 Claims, 3 Drawing Sheets

DIGITAL RIGHTS MANAGEMENT METHOD FOR TERMINAL

CROSS-REFERENCE TO RELATED APPLICATION

This application claims priority under 35 U.S.C. §119(a) on Korean Patent Application No. 10-2007-0000602 filed on Jan. 3, 2007, the entire contents of which are hereby incorporated by reference.

BACKGROUND

1. Field of Invention

This document relates to a digital rights management (DRM) method for a terminal.

2. Related Art

A digital rights management (DRM) system is a technology for controlling the use of digital content within the scope of contracts between a user and a content provider. DRM may control the usage of digital content such as text, music, images, movies, software, and games which are distributed through various channels.

The DRM system encodes content to be distributed, and permits only a user having a rights object (RO) to decode the distributed content, thereby preventing software piracy such as illegal copy and illegal distribution. The RO is a type of license for using content. The RO includes information such as a content encryption key, permission information, limitation information, state information, and a content decryption key.

Three methods for implementing digital rights management (DRM) have been introduced: Forward-Lock, Content and RO combined delivery, and Content and RO separate delivery. The Forward-Lock method is a technology which permits the user that received digital content to use the received digital content, and prohibits the received digital content from being modified or forwarded. In the Forward-Lock, an authentication key is not used for protecting digital content.

The Content and RO combined delivery method generate and deliver a DRM message, which binds digital content with an authentication key for defining rights for using digital content. Thus, the digital content of the DRM message received by a mobile communication terminal is used according to the rights definition included in the DRM message corresponding to the authentication key.

The Content and RO separate delivery method delivers digital content and a corresponding authentication key through separate messages. Thus, in order to use digital content received by a mobile terminal, an additional message including an authentication key has to be received from the service provider. Further, in the content and RO separate delivery, the digital content is encrypted into DRM content format (DCF). The corresponding authentication key delivered through the additional message is a Content Encryption Key (CEK) or a Rights Object (RO).

The DRM methods to be applied to digital content are selected by a service provider. Further, even if digital content is purchased from the same service provider, properties of ROs may vary corresponding to the scope of the contracts for the digital content purchased by a user. That is, different digital content rights may be assigned to the same content.

According to the conventional DRM system, content selected by a terminal is determined to be a duplicate of stored content if the selected content has a name identical to content previously stored in the terminal, thereby interrupting the download of the selected content. Thus, a user may not download content having a name identical to the name of the previously stored content even though the content has different digital content rights from the digital content rights of the previously stored content.

Therefore, various methods have been introduced that rename content when the same content is downloaded more that once and is already stored on a terminal. However, these methods inconvenience a user because a user must manage multiple files with different names for the same content.

SUMMARY

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, method for setting digital rights associated with content, the method includes receiving a request from a user to access content including digital rights defined by a first set of attributes, identifying if the user has existing digital rights to the content, wherein the existing digital rights is defined by a second set of attributes, and modifying the existing digital rights associated with the content to include the first set of attributes.

In one feature a DRM method is applied to the content, the DRM method comprising one of a combined delivery method, a separate delivery method, and a Forward-Lock method. The Forward-Lock method includes no limitation on the right for using content and does not allow transmitting content, the separate delivery method includes a limited right for using content and does not allow transmitting content, and the combined delivery method includes limited right for using content and allows a limited transmission of content.

In another feature modifying the existing digital rights includes adding content playback counters of the first and second attributes if the DRM method is the combined delivery method. Additionally, modifying the existing digital rights includes adding content playback periods of the first and second attributes if the DRM method is the combined delivery method.

In yet another feature modifying the existing digital rights includes comparing a content playback time of the first attribute to a content playback time of the second attribute and setting the existing digital rights to the content playback time having a longer expiration time if the DRM method is the separate delivery method. Additionally, modifying the existing digital rights comprises adding content transfer counts and content playback counters of the first and second attributes if the DRM method is the separate delivery method. Furthermore, modifying the existing digital rights includes adding content transfer periods and content playback periods of the first and second attributes if the DRM method is the separate delivery method. Finally, modifying the existing digital rights includes comparing a content transfer time and a content playback time of the first attribute to a content transfer and a content playback time of the second attribute and setting the existing digital rights to the content transfer time and the contents playback time having a longer expiration time if the DRM method is the separate delivery method.

In yet another feature, modifying the existing digital rights comprises setting the DRM method to the Forward-Lock method if the DRM methods applied to the digital rights and existing digital rights are different, wherein one DRM method is the Forward-Lock method and one DRM method is combined delivery method. Additionally, modifying the existing digital rights includes setting the existing digital rights to allow transfer of the content according to the separate delivery method and setting the existing digital rights to use the content according to the Forward-Lock method if the DRM methods applied to the digital rights and existing digital rights are different, wherein one DRM method is the Forward-Lock method and one DRM method is combined delivery method. Furthermore, modifying the existing digital rights includes setting the existing digital rights to allow transfer of the contents according to the separate delivery method and setting the existing digital rights to use the content according to the combined delivery method if the DRM methods applied to the digital rights and existing digital rights are different, wherein one DRM method is the combined delivery method and one DRM method is the separate delivery method.

Finally, in another feature digital rights method further includes determining the existing digital rights prior to downloading the content to a mobile terminal and also determining the existing digital rights after modifying the existing digital rights. Additionally, digital rights method further includes allowing access to the content if at least one of the digital rights and the existing digital rights is active.

In one embodiment, a terminal for issuing digital rights, includes a digital rights management (DRM) server for issuing a rights object to a terminal or a content server, and a content server for encoding content using encryption keys issued from the DRM server and providing encoded content to the terminal in response to a content download request wherein the DRM server also issues content encryption keys to the content server.

In yet another embodiment, a terminal for receiving digital rights, includes a communication module for receiving digital rights attributes and content, a processing module for reproducing multimedia files, a memory for storing the content and digital rights attributes, a digital rights analyzer for managing the digital rights corresponding to the content, a digital rights controller for determining if the memory contains existing digital rights for the content.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The present invention will be described in detail with reference to the following drawings in which like numerals refer to like elements.

DETAILED DESCRIPTION

Hereinafter, the present invention will be described in detail with reference to the attached drawings.

Figure 1:
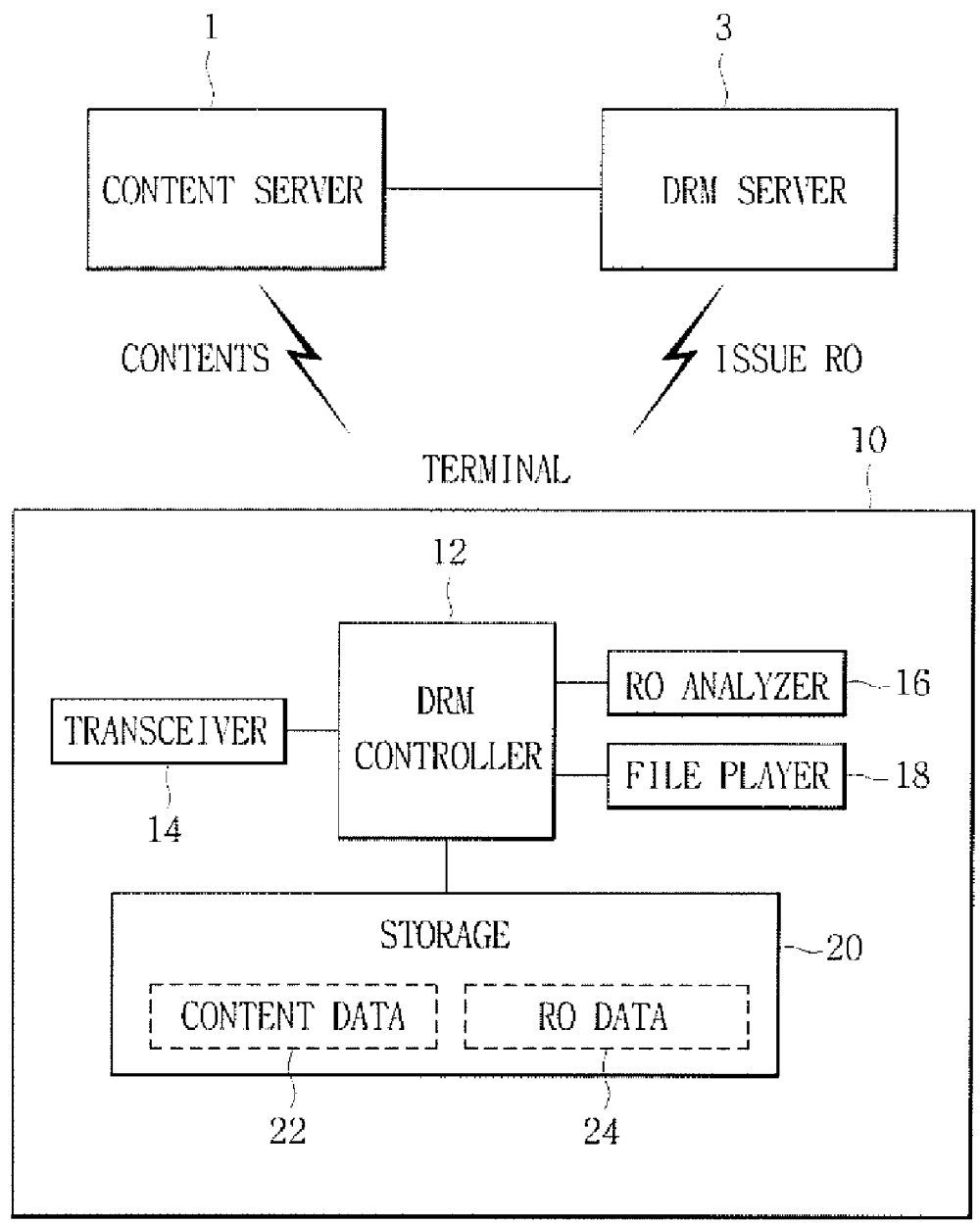
FIG. 1 is a block diagram illustrating a digital rights management (DRM) system according to the present invention.

FIG. 1 is a block diagram illustrating a configuration of a digital rights management (DRM) system according to the present invention. Referring to FIG. 1, the present system comprises a content server 1 for providing content, a DRM server 3 for issuing the rights objects (ROs) for the content provided by the content server 1, and a terminal 10 for downloading DRM data from the content server 1 and the DRM server 3 to use content associated with the downloaded DRM data according to a RO associated with the downloaded DRM data.

DRM data is data protected through the DRM system. That is, DRM data includes content provided by the DRM system, and may also include data defining rights for using the content such as a RO provided by the DRM system. The DRM data may be downloaded from content server 1 or DRM server 3.

Content server 1 encodes content such as an image, video, audio, and other digital content using encryption keys issued from the DRM server 3 and transmits the encoded content to terminal 10 in response to a content download request from terminal 10. DRM server 3 issues a rights object (RO) including permission information, limitation information, state information, a content encryption key, and a content decryption key for decoding the encoded content.

The DRM server 3 manages the history of the ROs which have been issued for the content of the content server 1. The DRM server 3 may report the history of the issuance of the ROs to the content server 1.

In the embodiment described above, content server 1 and DRM server 3 are described as different devices in this implementation. It should be noted that content server 1 and DRM server 3 may be implemented as one device.

A DRM method to be applied to the content may be selected from the above described three DRM methods: the content and RO combined delivery, the content and RO separate delivery, and the Forward-Lock. The Forward-Lock method only allows a user to use content within the terminal 10 which initially downloaded the content. Forward-Lock may block the transmission of the content from terminal 10.

Upon encoding content, a content identification (CID) may be generated for insertion into a header of the content. The CID may be used to identify the encoded content.

Terminal 10 may be implemented as a terminal comprising a communication module for receiving DRM data and a micro-processor for reproducing multimedia files. Terminal 10 may be implemented as a personal computer (PC), a personal digital assistant (PDA), a smart phone, a handheld PC, a mobile phone, or a MP3 player. The communication module may be a code division multiplexing access (CDMA) module, a Bluetooth module, an infrared ray communication (IrDA) module, or a wired/wireless LAN card.

Terminal 10 may include a transceiver 14 for transmitting and receiving DRM data, a storage unit 20 for storing the DRM data downloaded through transceiver 14, a RO analyzer 16 for analyzing and managing ROs associated with the DRM data, a file player 18 for playing back content associated with the DRM data, and a DRM controller 12 for processing the content according to the ROs and managing content having the same name according to DRM methods applied to the corresponding content and properties of the corresponding ROs.

Transceiver 14 receives content data 22 and RO data 24, or DRM data created by binding content data 22 with RO data 24 from content server 1 or DRM server 3, or another terminal 10. Transceiver 14 may perform a content transfer function and transmit the stored content data 22 to another terminal 10.

RO analyzer 16 analyzes RO data 24 for content 22 to determine content rights definitions for the use of content 22. For example, RO analyzer 16 may analyze content playback rights such as the rights to play, display, execute, and print.

Furthermore, RO analyzer 16 may analyze RO duplication rights such as the rights to copy and to move. RO analyzer 16 may also analyze limitations for content play back or transfer. These limitations may include content playback count constraints, a content transfer count constraint, a content playback time constraint, a content playback period limit, and a content playback accumulated time constraint.

File player 18 decodes the content data 22 encoded into a DRM format in order to play back the decoded content in an original format.

DRM controller 12 stores content data 22 and RO data 24 in storage unit 20 when a DRM method of the received DRM data is the content and RO combined delivery method or the Forward-Lock method. If a DRM method is the content and RO separate delivery method, DRM controller 12 downloads content data 22 and stores the downloaded content data 22 in storage unit 20, and then requests DRM server 3 to issue RO data 24. Afterward, when DRM controller 12 receives a request to play the stored content data 22, DRM controller 12 searches the RO data 24 corresponding to the requested content data 22 and allows the usage of the content data 22 according to the corresponding RO data 24.

DRM controller 12 checks a content identification (CID) assigned to content data 22 when a request to download the corresponding DRM data received in order, to determine whether the same content is previously stored. The DRM controller 12 may check the CID after downloading the requested DRM data or may request that the content server 1 provide the CID of the requested DRM data in advance in order to determine whether the storage unit 20 contains the same content data 22.

If the storage unit 20 already contains content data 22 with an identical name, DRM controller 12 may update the stored RO data 24 according to a predetermined priority by analyzing the RO data corresponding to the requested DRM data and the RO data 24 stored in the storage unit 20. The priority of the RO may be set when the system and the terminal 10 are designed or may be set by agreements between service providers. The priority of the RO may be stored in the terminal 10.

When different rights definitions are applied to the same rights type of the same content due to a plurality of ROs being assigned to the same content, the priority of ROs and the update method are used to choose one of the ROs to manage the content. In order to choose one of the ROs, the update method of the RO can be set in various forms. Table 1 and Table 2 show examples of properties of content and ROs according to the DRM methods, and examples of the priority of ROs when two different ROs are applied to the same content.

TABLE 1

Content and RO properties according to the DRM methods

| | Rights for transmitting content | Rights for using content |
|---|---|---|
| Forward-Lock (F/L) | Not allowed | No limitation |
| Combined delivery (C/D) | Not allowed | Allowed within limited range |
| Separate delivery (S/D) | Allowed within limited rage | Allowed within limited range |

TABLE 2

RO priority

| Method | Forward-Lock (F/D) | Combined delivery (C/D) | Separate delivery (S/D) | $2^{nd}$ delivery of DRM Data |
|---|---|---|---|---|
| Forward-Lock (F/L) | No-content transmission allowed No RO limitation | No-content transmission allowed No RO limitation | Reference for content transfer: S/D No RO limitation | |
| Combined delivery (C/D) | No-content transmission allowed No RO limitation | Sum of two ROs | Sum of two RO | |
| Separate delivery (S/D) | No RO limitation | Sum of two ROs Reference for content transfer: S/D | Reference for content transfer: S/D Sum of two ROs | |
| $1^{st}$ delivery of DRM Data | | | | |

Figure 2:
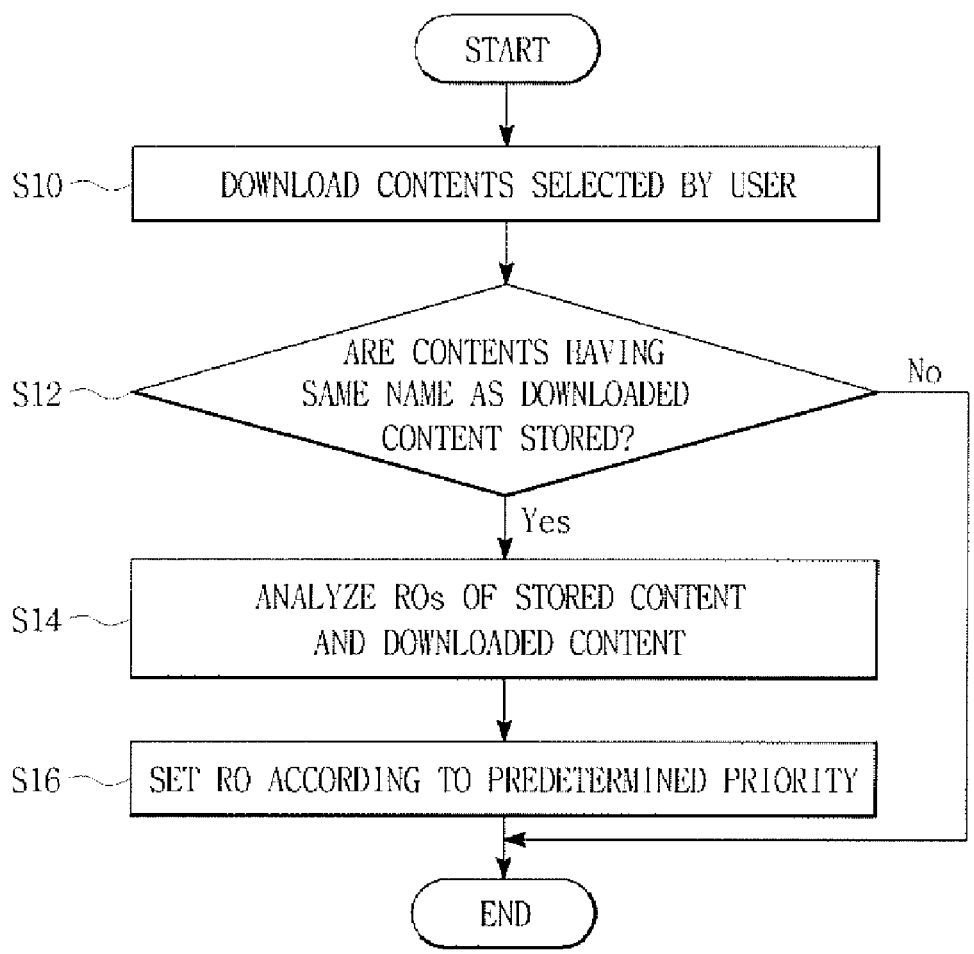
FIG. 2 is a flowchart illustrating a digital rights management method according to the present invention.

FIG. 2 is a flow chart depicting a digital rights management method according to one embodiment of the present invention for a terminal in a DRM system having the above described configuration.

Terminal 10 downloads DRM data including content selected by a user and stores the downloaded content data 22 in the storage unit 20 (S10). If the content and RO are delivered separately, terminal 10 requests that the DRM server 3 issue a RO for the downloaded content data 22.

The DRM controller 12 determines whether the storage unit 20 contains content identical to the content data 22 of the downloaded DRM data (S12). If storage unit 20 does not store the identical content, terminal 10 stores the downloaded DRM data in storage unit 20 and processes the downloaded DRM data according to the corresponding RO.

If storage unit 20 already stores content having a name identical to the content data 22 of the downloaded DRM data, DRM controller 12 analyzes the RO data 24 of the stored content data and the RO data of the downloaded content data 22 (S14). Based on the priority predetermined according to the RO data and content, DRM controller 12 sets a new RO to apply to the content 22 (S16). For example, DRM controller 12 analyzes the RO data of the requested content and stored content, creates a new RO, and sets the created new RO as the RO data of the corresponding content data. Alternatively, the stored RO data 24 may be partially updated to apply a new RO to the content 22.

Figure 3:
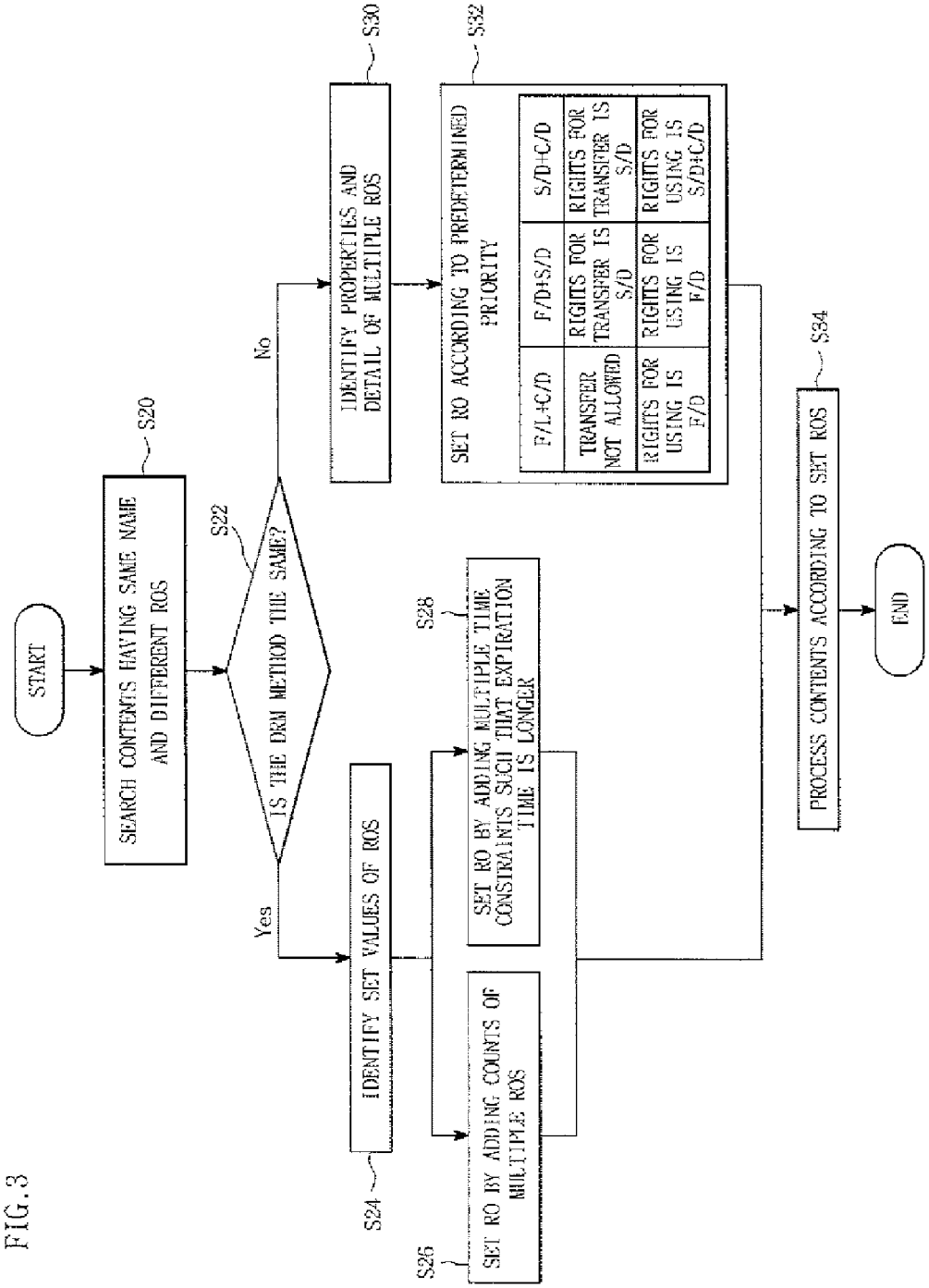
FIG. 3 is a flowchart illustrating another digital rights management method according to the present invention.

FIG. 3 is a flowchart illustrating a digital rights management method for a terminal 10 and specifically illustrating a step of applying a priority of ROs to content having the same name.

The DRM controller 12 searches for content having the same name and different ROs among content stored in the storage unit 20 (S20). The DRM controller 12 then determines whether the content is provided with the same DRM method (S22). For example, the DRM method may be content and RO combined delivery, content and RO separate delivery, or Forward-Lock.

If the DRM methods of the identical content are the same, the values set in the ROs are identified through RO analyzer 16 (S24). The values that may be identified through the RO analyzer 16 include limitations on playing back or transferring content, such as a content playback count constraint or a content transfer count constraint, a content playback time constraint, a content playback period limit, and a content playback accumulated time constraint.

If the values of the ROs are content playback or transfer count constraints, the content playback or transfer count constraints of the ROs may be added together to set a new RO to apply to the corresponding content (S26). For example, if the content playback count constraints of the ROs are set to, respectively, 3 and 4, the new content playback count constraint for the RO may be set to 7.

If the values of the ROs are content playback period constraints, the values of the ROs may be added together to set a new RO to apply to the corresponding content (S28). For example, if each of the content playback period constraints of the ROs are set such that one week is left to playback the corresponding content, a new RO may set to have a content playback period constraint of two weeks. If the RO is set with content playback time constraints, the content playback time constraint with a longer term may be selected to set a new RO.

If the DRM methods of the two content are different, each DRM method and RO is analyzed through the RO analyzer 16 (S30) and a new RO is set according to a predetermined priority, for example, according to Table 2.

For example, if the previously stored content is provided with Forward-Lock method and the downloaded content are provided with the content and RO combined delivery method, or vice versa, then a new RO is set to unlimited use of the content. Additionally, the content is restricted from being transferred regardless of the ROs being added together since the Forward-lock and the combined delivery do not allow for content transfer.

In another example, if the previously stored content is provided with the Forward-Lock method or the downloaded content is provided with the content and RO separate delivery method, or vice versa, the number of allowed transfers of the content allowed is limited according to the RO of the separate delivery method. The RO is set to unlimited use of the content in accordance with the Forward-Lock method.

In still another example, if the previously stored content is provided with the combined delivery method and the downloaded content are provided with the content and RO separate delivery method or vice versa, the number of allowed transfers of the content allowed is limited according to the RO of the separate delivery method. The usage rights of the content are set to the sum of values in the ROs of the content provided with the separate delivery method and the content provided with the combined delivery method.

After setting the new RO according to DRM methods and ROs of the previously stored content and the downloaded content, the new RO is applied to the content when the content is used (S34).

According to the present DRM method for a terminal, the DRM method and the RO may be implemented according to a predetermined priority when content identical to content stored in a terminal is selected for download. Therefore, content protected by copyrights may be conveniently managed and used.

The foregoing exemplary embodiments and aspects of the invention are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for setting digital rights in a terminal, the method comprising:

receiving a request from a user to access first content comprising a first set of attributes;

determining whether second content is stored in the terminal, wherein the second content is the same as the first content and comprises a second set of attributes; and modifying the second set of attributes to include the first set of attributes when it is determined that the second content is stored in the terminal, wherein:

the first set of attributes comprises digital rights for the first content and a Digital Rights Management (DRM) method comprising at least a combined delivery method, a separate delivery method, or a forward-lock method;

the forward-lock method does not comprise any limitation on a right to use the first content and does not allow transmission of the first content;

the separate delivery method comprises a limited right to use the first content and does not allow transmission of the first content;

the combined delivery method comprises the limited right to use the first content and allows limited transmission of the first content;

the second set of attributes comprises digital rights for the second content; and modifying the second set of attributes comprises adding content playback counters of the first and second sets of attributes when the DRM method comprises the combined delivery method.

2. The method of claim 1, wherein modifying the second set of attributes further comprises adding content playback periods of the first and second sets of attributes when the DRM method comprises the combined delivery method.

3. The method of claim 1, wherein modifying the second set of attributes further comprises:

comparing a content playback time of the first set of attributes to a content playback time of the second set of attributes; and setting the content playback time of the second set of attributes to a longer of the content playback time of the first set of attributes and the content playback time of the second set of attributes when the DRM method comprises the separate delivery method.

4. The method of claim 1, wherein modifying the second set of attributes further comprises adding content transfer counts and content playback counters of the first and second sets of attributes when the DRM method comprises the separate delivery method.

5. The method of claim 1, wherein modifying the second set of attributes further comprises adding content transfer periods and content playback periods of the first and second sets of attributes when the DRM method comprises the separate delivery method.

6. The method of claim 1, wherein modifying the second set of attributes further comprises:
   comparing a content transfer time and a content playback time of the first set of attributes to a content transfer time and a content playback time of the second set of attributes; and
   setting the second set of attributes to a longer of the content transfer time and
   content playback time of the first set of attributes and the content transfer time and content playback time of the second set of attributes when the DRM method comprises the separate delivery method.

7. The method of claim 1, wherein modifying the second set of attributes further comprises setting a DRM method of the second set of attributes to the forward-lock method when the DRM method of the first set of attributes is different from the DRM method of the second set of attributes.

8. The method of claim 1, wherein modifying the second set of attributes further comprises allowing the second set of attributes to transfer the second content according to the separate delivery method and allowing the second set of attributes to use the second content according to the forward-lock method when the DRM method of the first set of
   attributes is different from a DRM method of the second set of attributes.

9. The method of claim 1, wherein modifying the second set of attributes further comprises allowing the second set of attributes to transfer the second content according to the separate delivery method and allowing the second set of attributes to use the second content according to the combined delivery method when the DRM method of the first
   set of attributes is different from a DRM method of the second set of attributes.

10. A terminal for receiving digital rights, the terminal comprising:
    a communication module configured to access first digital rights and a first content from a server;
    a processing module configured to reproduce multimedia files;
    a memory configured to store a second content and second digital rights; and
    a digital rights controller configured to:
    determine whether the stored second content is the same as the accessed first content; and
    modify the stored second digital rights according to the accessed first digital rights when the accessed first content is the same as the stored second content,
    wherein:
    the terminal is different from the server;
    the first digital rights comprise a Digital Rights Management (DRM) method comprising at least a combined delivery method, a separate delivery method, or a forward-lock method;
    the forward-lock method does not comprise any limitation on a right to use the first content and does not allow transmission of the first content;
    the separate delivery method comprises a limited right to use the first content and does not allow transmission of the first content;
    the combined delivery method comprises the limited right to use the first content and allows limited transmission of the first content; and
    modifying the second set of attributes comprises adding content playback counters of the first and second sets of attributes when the DRM method comprises the combined delivery method.

* * * * *